United States Patent [19]

Brinkman

[11] 4,027,376

[45] June 7, 1977

[54] METHOD FOR PRODUCING SPARKING WHEELS

[75] Inventor: Earl W. Brinkman, Rochester, N.Y.

[73] Assignee: Davenport Machine Tool, Rochester, N.Y.

[22] Filed: Apr. 8, 1976

[21] Appl. No.: 675,147

[52] U.S. Cl. .............................. 29/417; 29/159 R; 29/558; 29/DIG. 15; 72/71; 76/101 A; 431/273

[51] Int. Cl.² ........................................ B23P 17/00

[58] Field of Search .......... 29/159 R, 417, 148.4 D, 29/159.2, 558, 557, DIG. 15, 78, 105 R, 105 A, DIG. 23; 76/101 R, 101 A; 72/68, 71, 70, 703; 431/273, 274–277

[56] References Cited

UNITED STATES PATENTS

| | | | |
|---|---|---|---|
| 2,297,983 | 10/1942 | Rea | 76/108 A |
| 2,455,348 | 12/1948 | Barstow | 76/101 A |
| 2,543,235 | 2/1951 | Dreyer et al. | 76/101 A |
| 2,852,962 | 9/1958 | Fabish | 76/101 A |
| 3,466,909 | 9/1969 | Weber | 72/68 |
| 3,742,753 | 7/1973 | Biesenbach | 29/558 X |
| 3,910,751 | 10/1975 | Chernock | 431/273 |

FOREIGN PATENTS OR APPLICATIONS

| | | | |
|---|---|---|---|
| 557,649 | 5/1923 | France | 431/273 |

Primary Examiner—Victor A. DiPalma
Attorney, Agent, or Firm—Shlesinger, Fitzsimmons & Shlesinger

[57] ABSTRACT

This method is particularly suited for practice on a multiple spindle screw machine in which each work spindle carries a length of bar stock. The work end of each bar is formed, sized and drilled in a conventional manner to form thereon a wheel shaped workpiece which is then rotated between two thread dies to form diagonal grooves in its periphery. The work is then subjected to two successive broaching operations which cut grooves transversely of the lands formed by the threading dies. When the work has entered the bore of the second broaching tool, the tool is rotated slightly relative to the work to upset the teeth so that their sharp cutting edges are caused to face outwardly.

5 Claims, 5 Drawing Figures

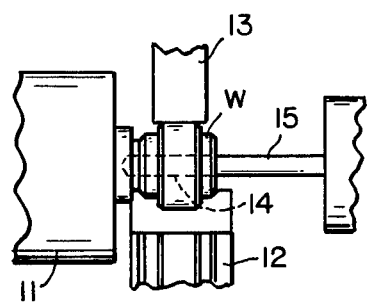
FIG. 1
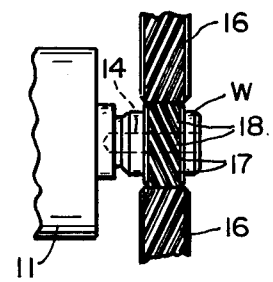
FIG. 2
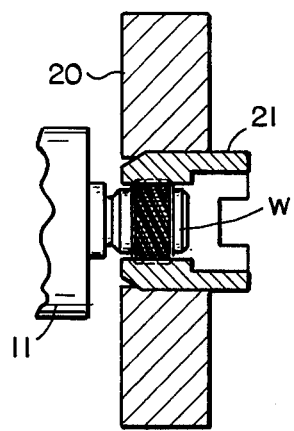
FIG. 3
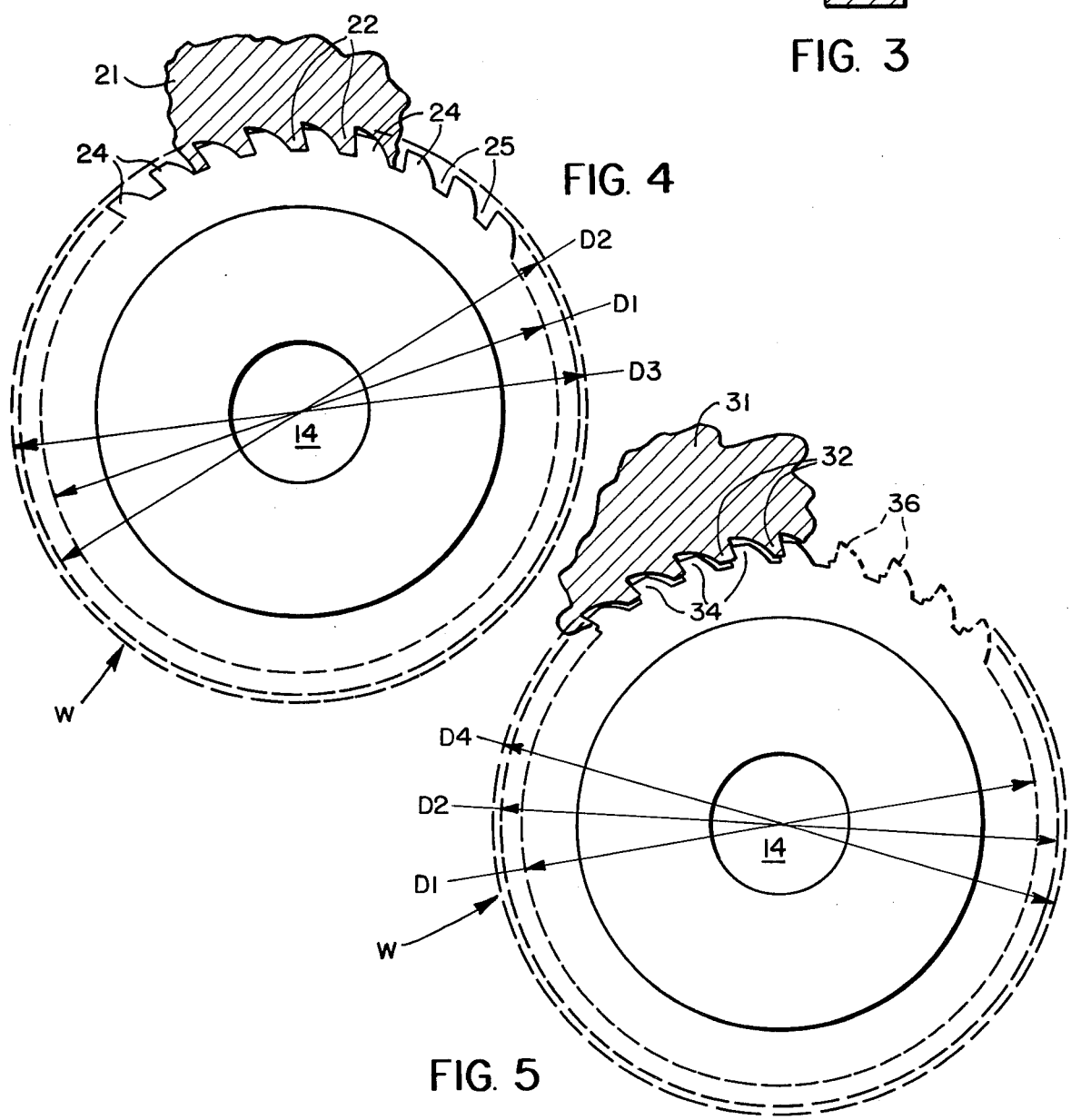
FIG. 4
FIG. 5

METHOD FOR PRODUCING SPARKING WHEELS

This invention relates to sparking wheels of the type having abrasive surfaces for use in striking flints in cigarette lighters and the like. More particularly, this invention relates to a novel method of forming the abrasive surfaces on the peripheral surfaces of such wheels.

Spark wheels of the type described usually have on their outer peripheral surfaces a plurality of spaced teeth or cutting edges, which are adapted to be rotated frictionally across a flint or similar pyrophoric material to produce sparks for igniting the fuel in conventional cigarette lighters and the like. Customarily the formation of these abrasive surfaces requires two basic operations. First a plurality of parallel grooves are formed in the outer surface of each wheel to extend at acute angles to the sides of the wheel. In the second operation a plurality of notches are cut in the lands formed in the wheel by the previous grooving operation, thus dividing each land into a plurality of spaced teeth to complete the abrasive surface.

Heretofore it has been customary to effect this second operation by employing either a reciprocating chiseling tool to notch the lands, or by forcing the wheel once through a broaching die to form parallel grooves extending transversely through the lands, or by rolling the grooved blank between a pair of toothed dies, which in turn form spaced notches in the lands.

The disadvantage of the process which involves the chiseling of the teeth into the grooved wheel surface is that it is extremely time consuming and expensive, since it takes numerous strokes of the chiseling tool to form the many teeth required on each wheel. The advantage of this process is, however, that the chiseling tool forces each tooth into an upstanding position in which its sharp, leading edge will be in a position to dig into the flint or pyrophoric material when in use. On the other hand, while the above-noted broaching operation (for example as disclosed in U.S. Pat. No. 2,455,348) cuts all of the lands in a single operation, when the grooved wheel is forced through the broaching die, nevertheless this latter operation has the disadvantage that the tips of the teeth formed in this manner are substantially flat, or lie in the plane of the original lands. Sparking wheels formed in this manner rely to a great degree for their satisfactory operation upon the numerous burrs which are created along the edges of the teeth by the single broaching operation.

It is an object of this invention, therefore, to provide an improved process which will combine the advantages of certain prior art methods of manufacturing sparking wheels, while obviating certain of the disadvantages inherent in such prior processes.

A further object of this invention is to provide a novel process which enables the extremely rapid production of sparking wheels having teeth which are inclined so that their cutting edges face outwardly.

Another object of this invention is to provide a novel method of employing a multiple spindle automatic screw machine for producing sparking wheels more efficiently than was heretofore possible.

A more specific object of this invention is to provide an improved method for forming teeth on the lands of a sparking wheel blank by two successive broaching operations, the second of which involves a slight rotation of the tool to upset the teeth on the wheel blanks so that their sharp edges are directed outwardly.

Other objects of this invention will be apparent hereinafter from the specification or from the recital of the appended claims particularly when read in conjunction with the accompanying drawing.

In the drawing:

FIGS. 1 to 3 illustrate schematically, and respectively, three successive preliminary operations which may be performed by, for example, an automatic screw machine on a piece of bar stock to prepare therefrom a sparking wheel according to the novel process disclosed herein;

FIG. 4 is an enlarged end view of a semi-finished sparking wheel made according to this invention, and illustrating fragmentarily and in section a first broaching tool which is employed in performing the operation illustrated in FIG. 3, and showing in solid lines the semi-finished teeth that are formed on the wheel by this tool; and FIG. 5 is a view similar to FIG. 4 but showing a second broaching tool that is used in the next step in this process, and illustrating in full lines the teeth as they appear on the wheel immediately after this second broaching tool has been inserted over the semi-finished wheel, and illustrating in broken lines the teeth as they appear in their final form after they have been upset in the next operation.

Referring now to the drawing by numerals of reference, and first to FIG. 1, W denotes a partially finished wheel or workpiece, which has been formed on the outer end of a length of bar stock that is chucked in known manner in one of the work spindles 11 of, for example, a multi-spindle automatic screw machine. At this stage the work W is sized between the sizing tool 12 and cooperating roll support 13, and is provided with an axial bore 14 by means of the drill 15 carried by the tool spindle (not illustrated) of the machine.

In the next operation (FIG. 2) the work W is rotated between a pair of special thread rolls 16, which have rolling engagement with the outer peripheral surface of the work W to form therein spaced, diagonally extending grooves 17. These grooves form parallel, diagonally extending lands 18 on the peripheral surface of the work W.

In the next operation (FIG. 3) the work W is subjected to a first broaching operation in which a first broaching tool 21 is inserted coaxially into the bore of a guide 20 which surrounds the work W. During this operation a plurality of axially extending teeth 22 (FIG. 4), that are formed in the bore of tool 21, cut the lands 18 into a plurality of spaced teeth.

In FIG. 4, wherein a portion of the broaching tool 21 is shown in section as viewed in a plane extending normal to the axis of the tool, the cutting teeth 22 are shown in the positions which they assume relative to the work W as the first broaching operation (FIG. 3) is taking place. During this operation the teeth 22 are drawn transversely across the lands 18 previously formed in the work, thereby dividing these lands into a plurality of angularly spaced, semi-finished teeth 24. These teeth 24 are separated by the transversely extending grooves 25, which are formed in the marginal, peripheral surface of the work W by the teeth 22 during the first broaching operation. In FIG. 4 the root diameter of the grooves 25 is denoted at D1; the outer diameter of the work W prior to the first broaching operation (i.e. the outer diameter of the lands 18) is denoted as D2; and the root diameter of the teeth 22 in the broaching tool 21 is denoted at D3.

From inspection of FIG. 4 it will be noted that after the first broaching operation, the crowns of the semi-finished teeth 24 correspond to the surfaces of the lands which were not removed by the broaching teeth 22, and consequently the crowns have the common diameter D2. Because of the shape of the teeth 22 in the broaching tool 21, the semi-finished teeth 24 appear to be inclined slightly in a counterclockwise direction as illustrated in FIG. 4. Nevertheless, the outer surfaces or crowns of the teeth 24 are smooth, and lie in the same plane as the lands 18 created by the rolling operation illustrated in FIG. 2. At this stage, therefore, the work W represents little more than that taught by the prior art.

To complete the novel process the semi-finished work W, as illustrated in FIG. 4, is next subjected to a second broaching operation during which it is forced coaxially through the bore of a second broaching tool 31 (FIG. 5) in the manner generally similar to that illustrated in FIG. 3. During the second broaching operation the teeth 32 formed in the bore of the broaching tool 31 shave away like portions of the work W from each of the semi-finished teeth 24, so that immediately following the passage of the work entirely into the bore of the tool 31, the outer peripheral surface of the work is provided with a plurality of spaced teeth 34, which are slightly narrower than the previously formed teeth 24. Also, the outer ends of teeth 34 still lie on a circle having the same diameter D2.

As soon as the work W has been forced into the bore of the broaching tool 31 to form the teeth 34, the tool 31 is rotated or twisted slightly in a clockwise direction, as illustrated in FIG. 5, relative to the work W, thereby causing all of the teeth 34 to be upset or bent slightly upwardly into their final, broken line positions as denoted at 36 in FIG. 5. This slight rotation of the tool 31, which may amount, for example, to from 3° to 5°, causes the sharp edges of the teeth 36 to face outwardly so that they will tend readily to scrape or dig into the surface of the adjacent flint or pyrophoric material, when the finished wheel is employed in a cigarette lighter, or the like. As a result of this twisting operation, therefore, the outer diameter D4 (FIG. 5) of the finished teeth 36 on the wheel or work W is slightly larger than the former outer diameter D2 of the work.

After the second broaching operation and the subsequent twisting of the broaching tool 31, the work W is withdrawn from the tool 31 and severed from the bar stock in known manner (not illustrated), thus producing the finished sparking wheel.

From the foregoing it will be apparent that the instant invention provides a relatively simple and inexpensive process for producing improved sparking wheels on automatic screw machines, and the like. While sparking wheels heretofore produced by performing a single broaching operation had to rely for satisfactory performance on the burrs formed during the broaching operation, the novel process disclosed herein produces a sparking wheel in which the sharp edges of all of the teeth on the periphery of the wheel are upset to face outwardly away from the center of the wheel, thereby to improve both the wheel performance and longevity.

By way of example, a typical wheel blank may have an outside diameter of 0.271 inches after having the grooves 17 formed therein. However, after the second broaching and tooth upset operations, the outside diameter of the sharp edges of the upset teeth 36 could fall in the range of 0.2842 to 0.2852 inches with approximately 11° 25' angular spacing between successive cutting edges of the teeth.

While the invention has been described in connection with the performance of the process on an automatic screw machine, it will be readily apparent that the process can be practiced on other machines, or even manually, if desired. Moreover, it will be apparent that it is not necessary that the lands 18 be formed on the work by the thread roller 16. On the contrary, these lands can be formed by any conventional operation, such as for example on a screw machine by die cutting, or by using a grooving tool, etc. Also, subsequent to the necessary machining operations, the sparking wheels can be heat treated or otherwise provided with an extremely hard, long-lasting surface to increase the life expectancy of the sparking wheel.

While this invention has been described in detail in connection with only a single embodiment thereof, it will be apparent that this application is intended to cover any modifications thereof that may fall within the scope of one skilled in the art or the appended claims.

Having thus described my invention, what I claim is:

1. A method of producing sparking wheels, comprising
    forming on the periphery of a circular wheel blank a plurality of spaced, helical lands which extend diagonally between opposite sides of the blank,
    forming the lands on said blank into a plurality of axially and angularly spaced teeth by forcing the blank at least once coaxially into the bore of a broaching tool having angularly spaced cutting surfaces which cut spaced notches transversely across said lands, and
    while the blank is still in the bore of said broaching tool and engaged with the cutting surfaces thereof, effecting a slight relative rotation between said blank and said tool so that said cutting surfaces upset the teeth formed in the lands between said notches.

2. A method as defined in claim 1, wherein the tooth forming step comprises,
    forcing said blank into the bore of a first broaching tool to cut a first plurality of notches in said lands,
    forcing said blank into the bore of a second broaching tool to remove portions of the teeth formed in the lands by the first broaching tool, and
    effecting said slight relative rotation between the second broaching tool and blank, while the blank is in the bore of said second tool.

3. A method of producing sparking wheels on an automatic screw machine of the type having at least one work spindle with a piece of bar stock projecting therefrom, comprising
    forming a generally wheel-shaped workpiece on the projecting end of the bar stock,
    rotating the workpiece between two threading dies to form in the periphery of the workpiece a plurality of spaced, parallel grooves, which extend generally helically of the axis of the workpiece, and which form on the surface of the workpiece a plurality of spaced, helical lands,
    subjecting the workpiece to successive broaching operations during each of which the workpiece is forced coaxially into the bore of a broaching tool having angularly spaced cutting surfaces which cut transverse notches in said lands to form spaced teeth therefrom on the periphery of the workpiece, while the workpiece is in the bore of the tool used in one of said successive broaching operations, effecting slight relative rotation between the workpiece and the last-named tool to upset the teeth formed in said lands, and thereafter severing the toothed workpiece from the stock on which it was formed.

4. A method as defined in claim 3, wherein said workpiece is subjected to two successive broaching operations, and said slight relative rotation takes place between said workpiece and the broaching tool employed in the second of said two successive operations.

5. A method as defined in claim 4, including drilling an axial bore in said workpiece before severing it from said stock.

* * * * *